United States Patent [19]
Menzel et al.

[11] 3,833,034
[45] Sept. 3, 1974

[54] TREE HARVESTER

[75] Inventors: Alvin Lewis Menzel; Stanley Robert Hiseler; Kenneth Quentin Kessler, all of Dubuque, Iowa; Edward George Nelson, Moline, Ill.

[73] Assignee: Deere & Company, Moline, Ill.

[22] Filed: Mar. 19, 1973

[21] Appl. No.: 342,456

[52] U.S. Cl............ 144/3 D, 144/2 Z, 144/309 AC
[51] Int. Cl............................................. B27c 9/00
[58] Field of Search ............ 144/2 R, 3 R, 3 D, 2 Z, 144/309 DC, 34

[56] References Cited
UNITED STATES PATENTS

| | | | |
|---|---|---|---|
| 3,198,225 | 8/1965 | Busch | 144/3 D |
| 3,464,468 | 9/1969 | Thompson et al. | 144/3 D |
| 3,586,078 | 6/1971 | Hamilton et al. | 144/3 D |
| 3,590,760 | 7/1971 | Boyd | 144/3 D |
| 3,708,000 | 1/1973 | Duffty et al. | 144/2 Z |
| 3,732,904 | 5/1973 | Hamilton et al. | 144/2 Z |
| 3,763,904 | 10/1973 | Eynon | 144/2 Z |

*Primary Examiner*—Andrew R. Juhasz
*Assistant Examiner*—W. D. Bray

[57] ABSTRACT

An articulated, four-wheel drive tree harvesting machine includes a front frame section upon which a felling boom assembly, a delimbing assembly and a feed assembly are mounted. The felling boom assembly is operable for severing a tree and lowering the same into a generally horizontal disposition from where the trunk of the tree may be released for engagement by feed rolls of the feed assembly and for encirclement by blades of the delimbing assembly. Once a tree is released by the felling boom assembly, the feed rolls may be operated to draw the tree trunk through the delimbing blades while the felling boom may be operated to sever and position a second tree. The tree harvesting machine has the capability to bunch at least three severed and delimbed trees.

24 Claims, 4 Drawing Figures

3,833,034

TREE HARVESTER

BACKGROUND OF THE INVENTION

The present invention relates to tree harvesting machines and more particularly relates to harvesting machines of a type for felling, delimbing and bunching trees.

There are several machines available for felling, delimbing and bunching trees, but at the present time, there is no suitable machine which can efficiently perform these operations. This is because the existing machines have one or more of the disadvantages of lacking full operator visibility of all operations, of being unstable during some operations due to structure projecting high into the air, of lacking maneuverability over difficult terrain and in relatively dense stands of trees due to the vehicle being either too wide and/or too long and of lacking the capability to delimb one tree while concurrently felling another tree and readying the latter for delimbing.

Accordingly, it is a broad object of the invention to provide a tree harvesting machine which overcomes the disadvantages, noted above, of existing machines. Specifically, it is an object to provide a machine having an articulated, four-wheel drive vehicle chassis, whereby the machine is highly maneuverable in most terrain conditions existing in forested areas, and to arrange harvesting equipment on the chassis such that the harvesting machine has the ability to clear-cut, to thin rows in a plantation and remove selected trees in the adjacent rows, and to strip-thin in a naturally regenerated stand of trees.

A further object of this invention is to provide a tree harvesting machine having the capability of performing concurrent felling and delimbing operations.

Still another object of this invention is to provide a tree harvesting machine having the ability to bunch at least three delimbed trees.

These and other objects will become apparent from the following description and the appended drawings.

SUMMARY OF THE INVENTION

According to the present invention, there is provided a tree harvesting machine including an articulated frame comprising a rear section on which is located a cab and engine of the vehicle and a front section on which is located felling boom, delimbing and feed assemblies.

The front and rear frame sections are each supported on a pair of driven ground wheels and the delimbing and feed assemblies are arranged such that a tree trunk being delimbed passes generally longitudinally of the machine along a predetermined path extending generally horizontally over one of each of the front and rear pairs of wheels and next to one side of the cab and engine.

The delimbing assembly includes delimbing blades located on the forward end of the front frame section and the feed assembly includes a pair of feed rolls located rearwardly of the delimbing blades and operative to pull a tree trunk through the blades. A ree support member is formed integrally with a vertically swingable stacking blade mounted on the rearward end of the rear frame section, the tree support serving to support a tree trunk of a tree being pulled through the delimbing blades.

When it is desired to bunch at least three delimbed tree trunks, a first tree is supported by the delimbing assembly and the tree support at the rear of the machine and a second undelimbed tree is supported by the felling boom assembly and a support bar located at the forward end of the machine. The machine is then advanced to a third, still standing tree. The partially delimbed tree is then delimbed and thereafter the second tree is placed into the delimbing and feed assemblies and is delimbed. The felling boom assembly is operated to sever the third tree and to introduce it into the delimbing and feed assemblies, once the second tree has passed therethrough, and the third tree is then delimbed. Since the machine remains in the same location during the delimbing of the three trees, the trees will lie in a bunch once they are delimbed.

DESCRIPTION OF THE PREFERRED EMBODIMENT

Preliminary to the description, it is to be noted that expressions contained herein such as "front," "rear," "forward," "rearward," "right-hand," "left-hand," "inner" and "outer" are made from the viewpoint of an operator seated in the cab of the machine and facing in the forward direction of travel thereof.

Figure 1:
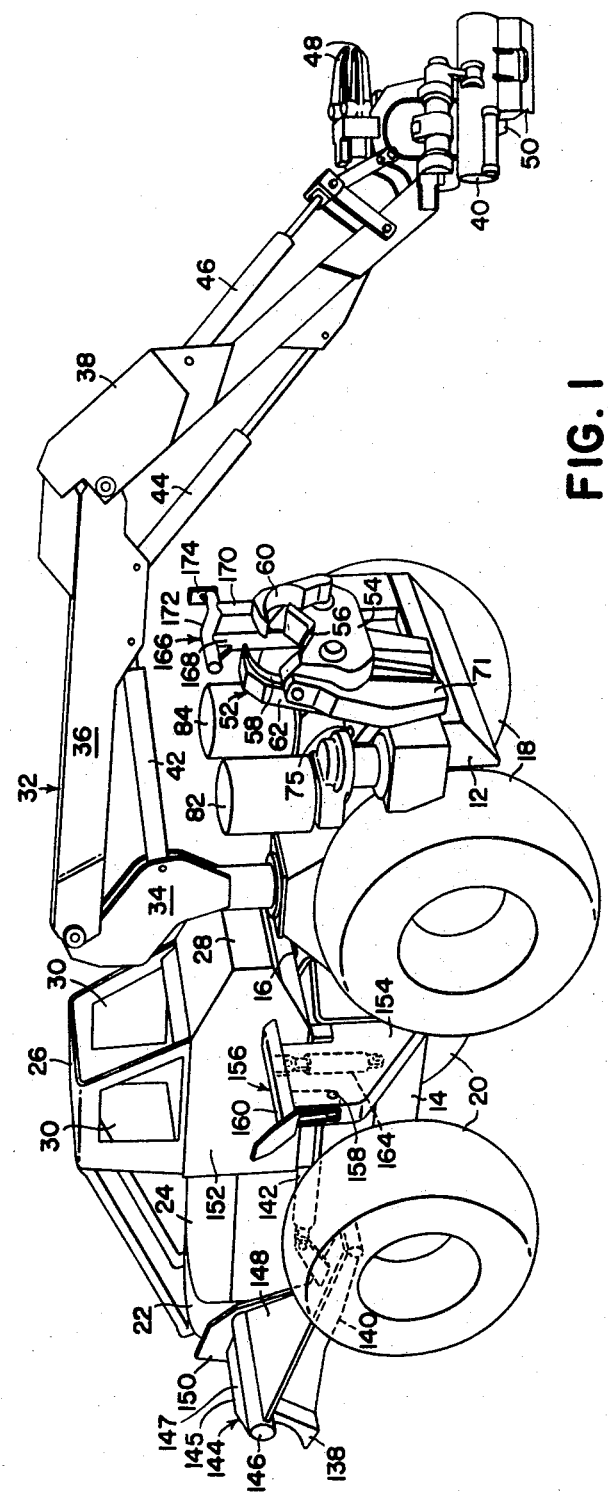
FIG. 1 is a perspective overall view of a tree harvesting machine constructed according to the principles of the present invention.
Figure 2:
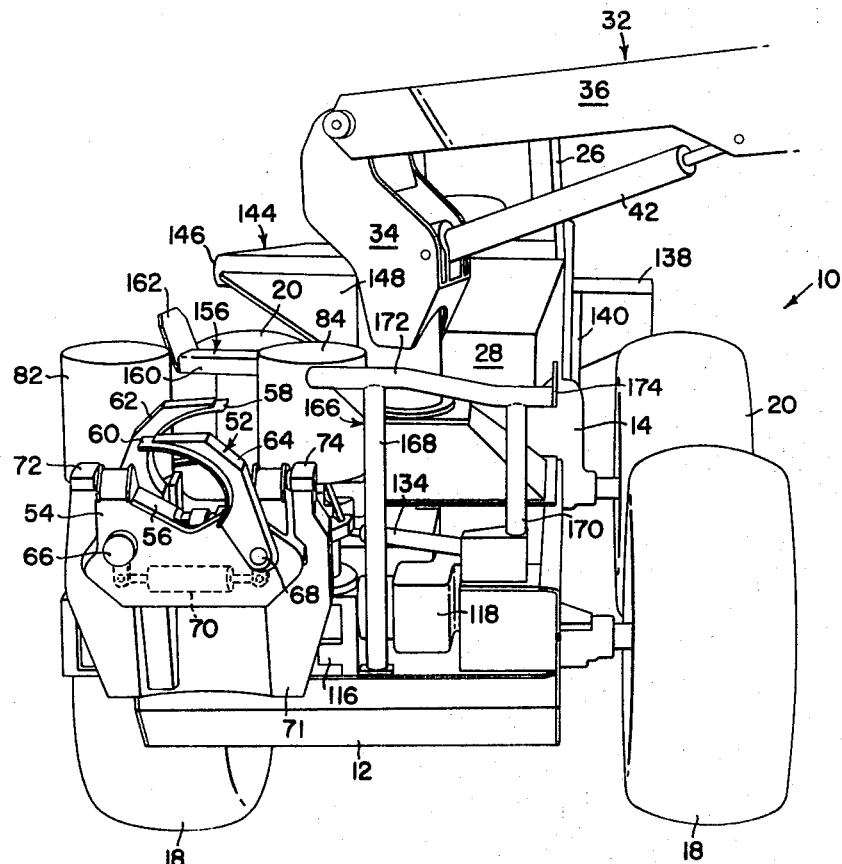
FIG. 2 is a rear perspective view of the machine shown in FIG. 1 but showing only a portion of the felling boom assembly.

Referring now to FIGS. 1 and 2, therein is shown a tree harvesting machine indicated in its entirety by the reference numeral 10. The machine 10 is constructed so as to be highly maneuverable in most conditions of terrain found in forested areas and for this purpose includes an articulated chassis comprising front and rear frame sections 12 and 14, respectively, which are connected together for relative movement about a vertical pivot axis defined by pin means, shown partially at 16. The front and rear frames are supported by front and rear pairs of driven ground wheels 18 and 20, respectively.

Mounted centrally on the rearmost portion of the rear frame section 14 is a radiator housing 22 in which a radiator and other components, not shown, are located. Forming a forward continuation of the radiator housing 22 is an engine housing 24 in which an engine, not shown, is located. The forward end of the engine housing 24 terminates at the rearward wall of a cab 26 which is mounted on the foremost portion of the rear frame section 14 and includes a nose 28 overlying the pivot pin 16. The cab 26 is provided with a plurality of windows, indicated at 30, located so as to permit an operator seated in the cab to see the operation of various components of the machine as will be apparent from the following description.

Mounted on the rear portion of the front frame section 12 just forwardly of the pivot pin 16 is a shear or felling boom assembly 32. The shear boom assembly comprises an upright support post 34 that is journaled in the front frame section for rotation about a vertical axis. Hydromechanical drive means (not shown) are connected to the lower end of the post 34 for selectively rotating the same. A first boom section 36 has opposite ends respectively pivotally connected to the upper end of the pose 34 and to one end of a second boom section 38 for swingable movement about respective parallel horizontal axes. A felling head 40 is in turn pivotally connected to the other end of the boom section 38 for pivotal movement about a generally horizontal axis which is parallel to the last-mentioned axes. A trio of extensible and retractable hydraulic actuators 42, 44 and 46 are mounted between the upright post 34 and the first boom section 36, between the first boom section 36 and the second boom section 38 and between the second boom section 38 and the felling head 40, respectively, for selectively swinging the boom sections and the felling head vertically relative to each other and to the upright post 34. The felling head 40 includes a pair of grapple tongs 48 located above a pair of shear blades 50, the pair of tongs and the pair of shear blades each being movable towards and away from each other respectively for grasping and for severing a tree trunk or stem located therebetween.

Mounted on the right-hand side of the forward end portion of the front frame section 12 is a delimbing assembly 52 including a subframe 54 having a V-shaped blade 56 fixed to the top thereof and arranged to support a tree trunk disposed along a predetermined path extending longitudinally of the harvesting machine. Located below and at the right- and left-hand sides of the V-shaped blade 56 are blades 58 and 60, respectively, which cooperate with the V-shaped blade to encircle a tree trunk supported by the V-shaped blade. The blades 58 and 60 are curved so as to approximate the curvature of a tree trunk and are fixed to right- and left-hand arms 62 and 64, respectively, the arms being respectively pivotally connected to the subframe 54 for swinging laterally towards and away from each other about respective fore-and-aft axes defined by rockshafts 66 and 68. The arms 62 and 64 are mounted at the rearward and forward sides, respectively, of the frame 54 so as to sweep overlapping paths located at the leading and trailing edges of the blade 56. Extending between a pair of lugs respectively depending from the rockshafts 66 and 68 is an extensible and retractable hydraulic actuator 70 for selectively swinging the blade-carrying arms 62 and 64 towards and away from each other. To ensure that the blades will be properly disposed with respect to a tree trunk gripped thereby, the subframe 54 is located between and pivotally connected to the opposite legs of a U-shaped blade support frame 71 for movement about a transverse horizontal pivot axis defined by right- and left-hand journal connections 72 and 74 located at the upper ends of the legs above the V-shaped blade 56, the blade support frame in turn being pivotally mounted on the frame section 12 for swinging about a vertical axis 75 defined by connection means at the rearward side of the frame 71. Thus, the frames 54 and 71 may pivot to align themselves with tree trunks or tree trunk portions which are angled from a predetermined generally horizontal fore-and-aft path so that the blades 58 and 60 are always disposed to cut limbs off as closely as possible to the trunk of the tree.

A tree feed assembly is located rearwardly of the blade assembly 52 for propelling a tree trunk rearwardly when the trunk is encircled by the blades thereby causing the limbs to be cut from the trunk. The feed assembly includes right- and left-hand feed roll structures 78 and 80, respectively. The feed roll structures 78 and 80 include cylindrical feed rolls or drums 82 and 84, respectively, which are mounted, in a manner to be described below, for being driven about their respective vertical longitudinal axes and for being swung about respective vertical axes spaced from said longitudinal axes. Although the rolls 82 and 84 are here shown as being smooth surfaced, the rolls would normally be provided with spikes or some other means for aggressively engaging a tree trunk.

For the purpose of driving the feed rolls, the right- and left-hand feed roll structures 78 and 80 include final drive output shafts 86 and 88, respectively, which are fixed to the rolls 82 and 84 and extend along the longitudinal axes thereof. The lower end portions of the output shafts 86 and 88 are journaled for rotation in final drive housings 90 and 92, respectively. Fixed on the lower end portions of the shafts 86 and 88 are driven gears 94 and 96, respectively, which are meshed with pinion gears 98 and 100 that are fixed to the upper end portions of vertically extending final drive input shafts 102 and 104, respectively, the shafts 102 and 104 also being rotatably supported in the respective drive housings 90 and 92. Respectively fixed to the lower ends of the input shafts 102 and 104 are driven gears 106 and 108 which are meshed with pinion gears 110 and 112, respectively, the pinion gears being fixed to a horizontally disposed drive shaft 114 rotatably supported in a drive housing 116. For the purpose of selectively driving the rolls 82 and 84 at high or low speeds in either a forward or reverse direction (the forward direction being indicated by the arrows in FIG. 4), there is provided a high-low-reverse transmission of a conventional hydraulically controllable type including a housing shown at 118 and having an output shaft (not shown) connected to the drive shaft 114. Power is fed into the high-low-reverse transmission through means of a power shaft (not shown) connected to the power take-off of the main drive transmission of the machine.

Figure 3:
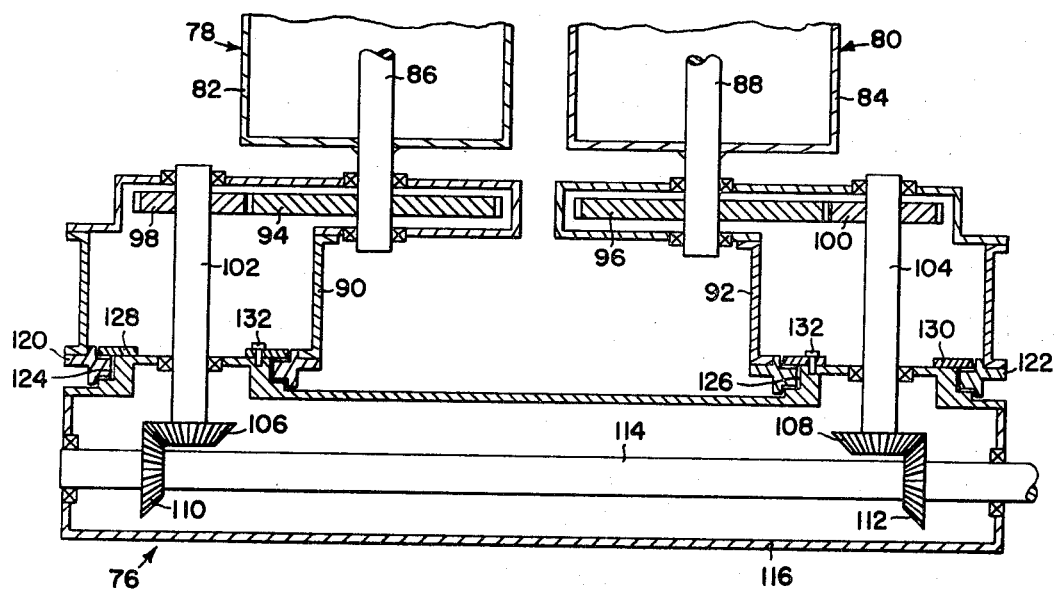
FIG. 3 is a somewhat schematic sectional view of the mounting and drive means for the feed rolls of the feed assembly.
Figure 4:
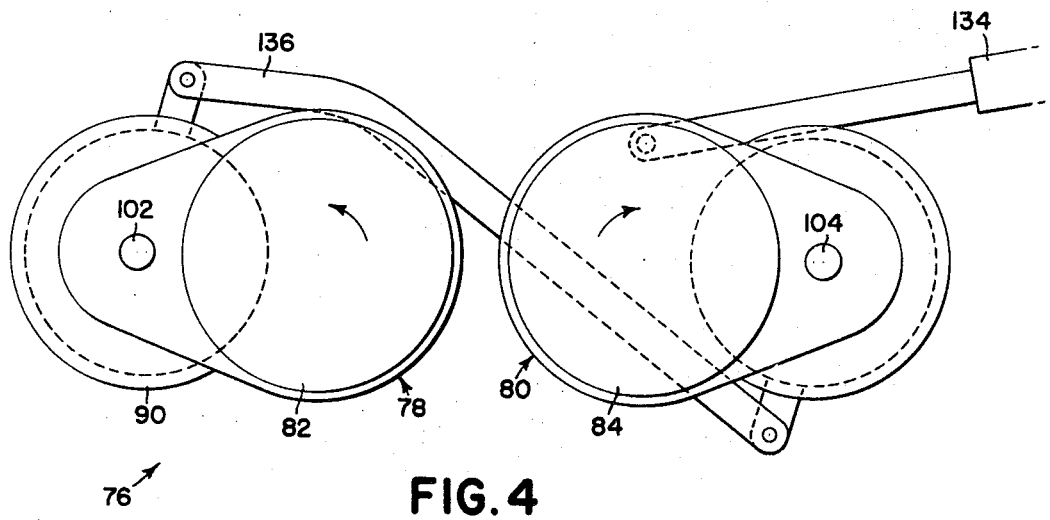
FIG. 4 is a somewhat schematic top plan view of the feed rolls showing the apparatus for causing simultaneous pivoting of the feed rolls about their respective mounting axes.

The final drive housings 90 and 92 are pivotally supported on the top of the drive housing 116 for swingable movement about respective axes extending coaxially of the final drive input shafts 102 and 104. This connection of the drive housings 90 and 92 with the housing 116 is made through means of respective annular wear rings 120 and 122 which are respectively seated on annular, stepped bearing surfaces 124 and 126 formed on the housing 116. The wear rings are held in place by respective fastener rings 128 and 130 which overlie a portion of the wear rings and are secured to the drive housing 116 through means of a plurality of screws 132. The rolls 82 and 84 are swung symmetrically, relative to the above-mentioned predetermined, longitudinally extending path along which a tree trunk being delimbed normally passes, through means of an extensible and retractable hydraulic actuator 134 having its cylinder end connected to the frame and having its rod end pivotally connected to the final drive housing 92, and through means of a tie rod 136 having its opposite ends pivotally connected to the drive housings 90 and 92. The drive rolls 82 and 84 may thus be swung between a moved together position, as shown in FIGS. 3 and 4, and a separated position by retracting the hydraulic actuator 134 to swing the final drive housing 92 clockwise which in turn causes the tie rod 136 to be moved so as to swing the final drive housing 90 counterclockwise from the positions shown in FIG. 4.

It is here noted that both the hydraulic actuator 70 and the actuator 134 are preferably connected in a closed-center hydraulic system capable of maintaining sufficient pressure at the actuators for keeping the delimbing blades and the feed rolls engaged with a tree trunk extending therebetween.

Mounted at the rearward end of the tree harvesting machine 10 is a conventional vertically adjustable stacking blade assembly including a transversely extending blade 138 fixed integrally with a pair of forwardly extending push arms 140 having their forward ends pivotally connected to the opposite sides of the rear frame section 14. The push arms 140 are raised and lowered vertically about their connection with the main frame through means of a pair of hydraulic actuators, one being shown at 142. Secured to the right-hand end portion of the blade 138 and the right-hand push arm 140 at a location in fore-and-aft alignment with the path traveled by a tree being delimbed is a tree support member 144 arranged for supporting a tree as it is being delimbed so that the tree remains in a generally horizontal position. The tree support member 144 includes a generally horizontal structure 145 fixed at its underside to the upper portion of the blade 138 and including an intermediate horizontally disposed generally cylindrical member 146 from which extends downwardly and rearwardly inclined and downwardly and forwardly inclined gusset-like deflector plates 147 and 148, respectively. The inner end of the structure 145, hence the inner end of the cylindrical member 146 and the inner edges of the deflector plates 147 and 148 are fixed to a vertical guide plate 150 which extends alongside the rear frame section 14 and has its lower edge fixed to the adjacent push arm 140. Thus, it will be appreciated that the tree support member 144 may be adjusted vertically to properly dispose it for supporting a tree trunk being delimbed, such adjustment of course being necessary to accommodate different sizes of trees and to allow for crooked tree trunks and for the downward sagging of limber tree trunks.

It is here noted that the right-hand side of the cab 26, as indicated at 152, is positioned so as to deflect outwardly any tree trunks which might have a tendency to travel inwardly because, for example, of their crookedness.

A further structure for supporting and handling tree trunks during and after delimbing is secured to the rear frame section 14 in the vicinity of the cab side 152 and comprises a bracket 154 formed from transversely extending vertical, fore-and-aft spaced plates having horizontal top surfaces and vertical outer surfaces. A retainer-ejector arm 156 is vertically pivotally connected to the bracket 154, as at a pin 158. The retainer-ejector arm 156 is angular in shape and includes a support section 160 and a guide plate section 162, the arm being swingable between a support position, as illustrated, wherein the support section 160 extends horizontally from the cab side 152 over the top of the bracket 154 and terminates at the guide plate 162 which extends upwardly therefrom, and a dump position wherein the support section 160 is disposed generally vertically at the outer side of the bracket 154, the guide plate section 162 then being angled outwardly and downwardly from the machine. Connected between the arm 156 and the bracket 154 for moving the arm between its support and dump positions is an extensible and retractable hydraulic actuator 164. Thus, it will be appreciated that if the weight distribution of a tree trunk being delimbed is not such that the majority of the trunk weight is rearwardly of the tree support member 144 by the time that the trunk has passed through the feed rolls 82 and 84, the retainer-ejector arm can be swung to the dump position to deposit the delimbed tree trunk to the right-hand side of the machine 10.

A tree support member 166 is fixed to the left-hand front portion of the front frame section 12 and serves to act in combination with the grapple tongs 48 of the shear boom assembly to support a felled undelimbed tree, for a purpose to be explained below. The support member 166 includes a pair of transversely spaced upright supports 168 and 170 to the tops of which are secured a cross member 172 having a plate 174 welded at its left-hand end and being curved downwardly between an intermediate location and the left-hand end.

An important feature of the delimbing machine 10 is the fact that the components thereof heretofore described are either located between or are mounted for movement so as to be located between the transverse outer sides of the front and rear pairs of ground wheels 18 and 20, respectively, and the fact that the delimbing blade assembly 52, the tree feed assembly 76, the tree support 144 and the retainer-ejector arm 156 are all located for operating on a tree trunk passing generally horizontally above the level of the ground wheels and longitudinally of the machine and along a path inwardly of the outer sides of the ground wheels located at the right-hand side of the machine 10. This feature is important since the machine may move straight through a plantation of trees and remove only those trees necessary to leave a path which will accommodate the width of the machine 10. Furthermore, since the delimbed trees are deposited substantially in the tracks of the wheels at the right-hand side of the vehicle, the damage to new forest growth is kept at a minimum. In addition to being positioned for keeping the machine width at a minimum, the elements are positioned so as to be in full view of an operator seated in the cab 26.

In operation, the delimbing machine 10 is moved to a logging site either by driving or by hauling, it being noted that the dimensions of the machine 10 permit it to be legally driven over most roads and to be accommodated on most flat bed trucks. Once at a harvesting site, the tree harvesting machine 10 is driven adjacent to a tree to be felled and the operator then controls the shear or felling boom assembly 32 so as to position the shear head 40 against a tree, the grapple tongs 48 then being closed upon the tree and the shear blades then being operated to shear the tree. Once the tree is sheared, the hydraulic actuators 42, 44, and 46 are actuated so as to tilt the tree to a generally horizontal position and to position the butt portion of the tree, now located in the shear head, to a position above and between the two feed rolls 82 and 84 and the two delimbing blades 58 and 60, the rolls and blades being in respective open positions wherein they are spread apart from each other. The tree is then released from the shear head by opening the grapple tongs 48 and the thus released tree falls upon the V-shaped delimbing blade 56. The hydraulic actuator 70 is then extended to cause the blades 58 and 60 to be pressure engaged with the trunk of the tree, the blades 58 and 60 then co-operating with the V-shaped blade 56 to encircle the tree trunk. The blades 56, 58 and 60 will now be closely adjacent to the trunk since the subframe 54 will have pivoted about the axis defined by the journals 72 and 74 and the blade support frame 71 will have pivoted about the axis 75 so as to keep the pivot axes of the blade arms more or less parallel to the length of the tree. The hydraulic actuator 134 is then extended to effect the closing of the feed rolls 82 and 84 upon the tree trunk. The feed roll drive is then actuated into a forward driving mode and is engaged to drive the feed rolls 82 and 84 to pull the tree trunk through the delimbing blades 54, 58 and 60. If the tree trunk has irregularities, such as crooks or the like, along its length, the pivot connections of the sub- and delimbing blade support frames will act to keep the blades in proper alignment with the trunk as the latter is propelled rearwardly.

As the tree trunk is propelled rearwardly, it first passes over the retainer-ejector arm 156, which is now in its support position, and then passes on over the tree support member 144. If the tree trunk is crooked and is disposed in the feed rolls such that it travels towards the cab 26, the cab side 152 will fend the oncoming tree off its course and cause it to proceed in the desired fore-and-aft direction. Once the tree trunk has passed through the feed rolls 82 and 84, the weight of the tree portion rearwardly of the tree support member 144 will normally be sufficient to cause the tree to tilt downwardly so that the butt end portion thereof rests on the ground at the rear of the harvesting machine. Then as the tree harvesting machine is driven forwardly, the tree will normally drop in place. In the event that that portion of the tree rearwardly of the support member 144 is not heavy enough to cause the tree to tilt downwardly, the tree trunk may be deposited to the right-hand side of the machine by extending the hydraulic actuator 164 to effect the movement of the retainer-ejector arm 156 from its support to its dump position.

If it is desired to bunch trees being felled and delimbed, the operator needs only to introduce a first-felled tree into the feed rolls 82 and 84, as described above and actuate the feed rolls to cause the first tree trunk to be moved to a position wherein it is supported on the harvesting machine. The tree harvesting machine is then advanced to a second tree to be felled and the shear boom assembly 32 is operated to fell the tree and swing the tree to a generally horizontal position. The tree may then be retained in the shear head tongs 48, while the vehicle is advanced to a third tree to be sheared. The felling boom assembly is then operated to place the butt end portion of the tree upon the cross member 172 of the front tree support member 166 and to shear the third tree. Once the machine is adjacent the third tree, the feed rolls are again operated to advance the first tree to complete the delimbing thereof whereupon the third tree is inserted into the feed rolls by manipulating the shear boom assembly 32. The shear boom assembly is then operated to place the second tree in a position for engagement by the feed rolls 82 and 84 and for encirclement by the delimbing blades 56, 58 and 60. The feed rolls are then operated to pull the second tree through the blades and thus effect the delimbing thereof. Since the three trees are all delimbed while the harvesting machine 10 is in one place, the three delimbed tree trunks will be in a bunch. Alternately, after shearing the second tree, the shear boom assembly may be operated to place the butt end portion of the tree on the cross member 172 and then operated to release the tree and to subsequently again grasp the tree at a location spaced forwardly from the cross member 172. The tree is then elevated from the ground and the tree harvesting machine 10 is advanced to the third tree to be felled. Once the machine is adjacent the third tree, the feed rolls are operated to complete the delimbing of the first tree whereupon the shear boom assembly is operated to first place the second tree in position for engagement by the feed rolls and then to shear the third tree and subsequently place it in position for engagement by the feed rolls once the second tree is delimbed.

It is also possible to bunch trees, which are of insufficient length to fall rearwardly off the rear tree support member 144, by permitting a number of trees to accumulate on the retainer-ejector arm 156 and then by actuating the hydraulic actuator 164 to dump the accumulated trees to one side of the vehicle.

It is important to note that because the tree harvesting machine has no components which are fixed laterally outwardly beyond the wheels thereof and that the tree trunks are delimbed while passing generally horizontally longitudinally of the machine, the machine is suited quite well for harvesting trees in a row since the machine can proceed straight forward leaving the delimbed trees therebehind. Also, since the shear boom assembly 32 is movable from side to side, the machine is also suitable for thinning trees from rows which are adjacent to and on opposite sides of the one that is in the path of the machine.

Also, since the delimbing machine 10 is articulated, compact and of a low-profile design, it is maneuverable through the woods so as to do selective thinning.

We claim:

1. A tree harvesting machine comprising: main frame means elongated in a normal fore-and-aft direction of travel; front and rear pairs of ground-engaging means connected in supporting relationship to the front and rear end portions, respectively, of the main frame means with the opposite ground-engaging means of each pair being respectively spaced laterally of opposite sides of the main frame means; delimbing blade means being mounted on the forward end portion of said frame means for receiving, encircling and delimbing a tree stem as the latter is being fed endwise therethrough along a path extending longitudinally of said machine at least partially directly above said ground-engaging means and being located outwardly from said main frame means no further than the ground-engaging means; tree stem feed means being mounted on the main frame means directly behind the stem delimbing means and at least partially directly behind said front pair of ground-engaging means for propelling a tree stem along said horizontal path; first tree stem support means mounted on the rear end of said frame means and located for supporting a tree stem as the latter moves along said path; and extensible and retractable tree handling means being mounted on said main frame means rearwardly of said feed means for manipulating a tree stem into a position for introducing the butt end portion thereof into said feed means.

2. The machine defined in claim 1 and further including a cab being mounted on said main frame just rearwardly of said tree handling means; said cab having one side extending generally foreand-aft and being located just inwardly of said horizontal path whereby it serves to guide tree stems along said path.

3. The machine defined in claim 1 and further including a retainer-ejector means mounted on said main frame means at a location intermediate said tree stem feed means and said supporting means; said retainer-ejector means including an arm pivotally mounted for movement about a fore-and-aft horizontal axis between a supporting position wherein it extends generally horizontally outwardly at a location for disposing the arm in a position for supporting a tree stem extending generally horizontally from said tree feed means, and a dump position wherein it extends generally vertically for depositing a supported tree stem outwardly of said gound support means at said one side of the frame means.

4. The machine defined in claim 3 and further including a stacking blade assembly including a stacking blade extending transversely in spaced relationship rearwardly of the rear end of said main frame means and being vertically pivotally connected to the latter through means of a pair of arms; power means connected between said main frame means and said pair of arms for swinging the latter vertically to adjust the vertical disposition of said blade; and said first tree supporting means forming an integral part of said blade assembly.

5. The machine defined in claim 1 wherein said feed means comprises a pair of feed rolls respectively mounted for swinging towards and away from each other about vertical axes located on opposite sides of said path.

6. The machine defined in claim 1 and further including second tree stem support means mounted on the front of said main frame means adjacent said feed means.

7. A tree felling and delimbing vehicle comprising: front and rear main frame sections being pivotally interconnected for relative movement about a vertical axis; front and rear pairs of ground wheels respectively being connected in supporting relationship to said front and rear frame sections with the opposite wheels of each pair being at the opposite sides of said frame sections; delimbing means being mounted on the forward frame section adjacent one side thereof and including blade means positioned for encircling and delimbing a tree stem extending horizontally approximately at the level of the top of the wheels and for propelling the same along a fore-and-aft extending path located inwardly of the outer sides of but at least partially above the wheels at one side of the vehicle when the wheels are in fore-and-aft alignment; tree stem propelling means being mounted on said front frame section just rearwardly of said delimbing means and being at least partially in fore-and-aft alignment with the wheels at said one side of the vehicle for selectively propelling a tree stem along said path; a tree stem suppporting means being mounted at the rearward end of said rearward frame section and including support surface means extending generally horizontally below said path for supporting a tree stem being propelled through said delimbing means by said propelling means; and tree shear means being mounted on said front frame section and being operable for shearing a standing tree and then manipulating the cut tree so as to introduce the butt end portion thereof into said propelling means.

8. The machine defined in claim 7 and further including a retainer-ejector means supported by one of said front and rear frame sections at a location between said wheels at one side of the vehicle for movement between a first position wherein it extends below said path for supporting a tree stem as the latter progresses along said path and a second position to one side of said path for depositing the tree stem to one side of the vehicle.

9. The machine defined in claim 8 wherein said retainer-ejector means is supported by said rear frame section.

10. The machine defined in claim 8 wherein a cab is supported on said rear frame section and has one side thereof extending parallel to and adjacent to said path; and said retainer-ejector means being located adjacent to said one side of said cab.

11. The machine defined in claim 7 wherein said tree supporting means is vertically adjustable.

12. The machine defined in claim 7 wherein said machine further includes stacking blade means vertically adjustably mounted at the rear end of said rear frame section and said tree supporting means being mounted on one side of said blade means so as to be vertically swingable therewith.

13. The machine defined in claim 7 wherein said tree stem propelling means comprises a first feed roll mounted for rotation about a vertical axis, disposed so as to be in fore-and-aft alignment with the wheels at one side of the vehicle, and for pivoting toward and away from said path about a first vertical axis located to one side of said path; a second feed roll mounted for rotation about a vertical axis and for pivoting about a second vertical axis located transversely of and on the opposite side of said path from said first vertical axis; drive means being connected to said first and second rolls for rotating the latter; and power means being connected to said rolls for simultaneously swinging the rolls equal amounts towards and away from said path about said first and second axes.

14. The machine defined in claim 13 wherein said power means includes an extensible and retractable hydraulic motor having opposite ends respectively connected to one of said first and second rolls and to said front frame section, and a motion-equalizing link having opposite ends respectively pivotally connected to said first and second rolls.

15. A tree harvesting machine comprising: main frame means elongated in a normal fore-and-aft direction of travel; a pair of ground-engaging means connected to said main frame means in supporting relation thereto and being located at the opposite sides thereof; a delimbing means being mounted on said main frame means towards one side of the forward end thereof; said delimbing means including adjustable blade means movable relative to each other between a spaced apart first position, for receiving and supporting a fore-and-aft extending tree trunk, and a moved together second position for tightly encircling a received tree trunk; tree supporting means connected to said main frame means at a location spaced rearwardly of said delimbing means in general fore-and-aft alignment therewith and including tree supporting surface means arranged for supporting the trunk of a tree received in said blade means and extending generally horizontally and rearwardly therefrom; feed means mounted on said main frame means rearwardly of said delimbing means for engaging the trunk of a tree received in said delimbing means and propelling the engaged trunk rearwardly; extensible and retractable tree handling means being mounted on said main frame means and operable for placing a cut tree into a generally fore-and-aft extending position and introducing the tree into the delimbing blade means when the latter are in their tree-receiving position; and said delimbing means, feed means and tree supporting means being so located relative to the ground-engaging means at one side of said main frame means that a tree stem extending between said feed means and said supporting means will be supported substantially directly above the ground-engaging means at said one side of the frame means.

16. The tree harvesting machine defined in claim 15 and further including an operator's cab mounted centrally on said main frame means at a location approximately midway between the front and rear ends of the frame means; said cab having an upright, fore-and-aft extending side positioned so as to be adjacent to a tree trunk extending between said delimbing means and supported on said tree supporting surface means.

17. The tree harvesting machine defined in claim 15 wherein said tree supporting means includes a first tree support structure located at the rear end of said machine; said first tree support structure being vertically adjustably connected to said main frame means and said first tree supporting surface means extending generally horizontally and forming a portion of said first tree support structure.

18. The tree harvesting machine defined in claim 15 and further including a stacking blade assembly located at the rear end of said machine and including a transverse blade; a pair of transversely spaced push arms having rearward ends fixed to said blade and forward ends pivotally connected to said main frame means for swinging about a horizontal transverse axis; power means connected between said frame means and said arms for swinging the latter vertically about said last-mentioned axis; said tree supporting means including a first tree support structure fixed to said stacking blade assembly; and said tree supporting surface means including a first upwardly facing support surface forming a part of said first tree support structure.

19. The tree harvesting machine defined in claim 16 wherein said tree supporting means includes a guide structure including a transversely extending support section having an inner end positioned adjacent said cab side and an outer end fixed to an upwardly extending guide section; said guide section and cab side thus cooperating to quide a tree trunk across the support section extending between the cab and the guide section when the trunk is being delimbed.

20. The tree harvesting machine defined in claim 19 wherein said support and guide sections form an arm pivotally mounted for vertical swinging movement, about a generally horizontal, fore-and-aft extending axis, between a support position, wherein said support section is generally horizontal and said guide section extends upwardly, and a dump position, wherein said support section is rotated approximately 90° from said support position and faces outwardly from said main frame means while the guide section inclines downwardly and outwardly from the main frame means; and power means connected between said bracket and said arm for moving the arm between said support and dump positions.

21. The harvesting machine as defined in claim 15 wherein said main frame means comprises front and rear frame sections pivotally connected together for relative movement about a vertical axis; said felling boom, delimbing and feed assemblies being located on said front frame section; a cab being mounted on the forward end portion of the rear frame section; an engine housing being mounted on the rear frame section just rearwardly of the cab; said cab and engine housing having respective fore-and-aft extending sides disposed so as to be inwardly of and adjacent to a tree trunk extending between said feed means and said tree supporting means.

22. The tree harvesting machine defined in claim 15 wherein said tree supporting means includes a tree support structure fixed to the forward end of said main frame means on the side opposite from said delimbing blade means; and said tree support structure including a transverse cross member spaced above said main frame means whereby a tree may be supported on said machine by first operating the tree handling means to place the butt end portion of a cut tree on the cross member and then by operating the tree handling means to elevate the tree to a generally horizontal position.

23. A tree harvester comprising: an articulated vehicle having first and second wheeled frames articulately connected to one another to swing relative to one another about a substantially vertical axis; structure on the vehicle for supporting a tree section alongside the vehicle including a means for moving a tree section fore and aft along the structure; and a delimbing mechanism on one of said frames that delimbs a tree section as it passes along the structure; and a boom structure carried on said one frame to swing on a vertical axis and having means at its end for gripping a tree section.

24. A tree harvester comprising: a vehicle having front and rear ends, transversely spaced ground wheels at said ends and an operator's station facing forwardly; structure on the vehicle for supporting a tree section alongside one side of the vehicle and at least partially above the wheels on the respective side and including a means for moving a tree section from front to rear along the structure; a delimbing mechanism on the front end for delimbing a tree section as it passes along the structure; and a boom structure forwardly of the operator's station and carried on said vehicle to swing on a vertical axis inboard of said delimbing mechanism, said boom structure having means at its end for gripping a tree section.

* * * * *